(12) United States Patent
Kösters

(10) Patent No.: US 8,134,040 B2
(45) Date of Patent: Mar. 13, 2012

(54) REACTOR PANEL FOR CATALYTIC PROCESSES

(75) Inventor: Peter Hubertus Kösters, Velen (DE)

(73) Assignee: Saudi Basic Industries Corporation, Riyadh (SA)

( * ) Notice: Subject to any disclaimer, the term of this patent is extended or adjusted under 35 U.S.C. 154(b) by 130 days.

(21) Appl. No.: 12/452,364

(22) PCT Filed: Jun. 25, 2008

(86) PCT No.: PCT/EP2008/005266
§ 371 (c)(1),
(2), (4) Date: Feb. 18, 2010

(87) PCT Pub. No.: WO2009/003648
PCT Pub. Date: Jan. 8, 2009

(65) Prior Publication Data
US 2010/0145104 A1 Jun. 10, 2010

(30) Foreign Application Priority Data
Jul. 5, 2007 (EP) ..................................... 07013192

(51) Int. Cl.
*C07C 5/333* (2006.01)
*B01J 19/00* (2006.01)
(52) U.S. Cl. ......... 585/654; 422/198; 422/213; 422/600
(58) Field of Classification Search .................. 422/197, 422/198, 213, 600; 585/654
See application file for complete search history.

(56) References Cited

U.S. PATENT DOCUMENTS

| | | | |
|---|---|---|---|
| 2,944,876 A * | 7/1960 | Polk | 422/652 |
| 2,988,063 A | 6/1961 | Vorkauf et al. | |
| 3,172,739 A * | 3/1965 | Koniewiez | 422/629 |
| 3,453,087 A | 7/1969 | Herp, Jr. et al. | |
| 3,607,130 A * | 9/1971 | Worley et al. | 422/625 |
| 3,899,420 A * | 8/1975 | Nozawa et al. | 48/109 |
| 4,513,162 A * | 4/1985 | Al-Muddarris | 585/654 |
| 4,685,426 A | 8/1987 | Kidaloski et al. | |
| 5,380,502 A * | 1/1995 | Murphy et al. | 422/652 |

FOREIGN PATENT DOCUMENTS
GB 1 320 148 A 6/1973
WO WO 01/56690 A 8/2001
* cited by examiner

*Primary Examiner* — Walter D Griffin
*Assistant Examiner* — Huy-Tram Nguyen
(74) *Attorney, Agent, or Firm* — Cantor Colburn LLP

(57) ABSTRACT

Modular reactor panel (1) for catalytic processes, comprising a feed header (5), a product header (7) and adjacent channels (3), each channel (3) having a length, running from an entrance end to an exit end, and wherein the entrance ends are directly connected to and open into the feed header (5) and the exit ends are directly connected to and open into the product header (7) and wherein the feed header (5) has at least one connection (9) to a feed line (51) and the product header (7) has at least one connection to a product line (55) and wherein part (21) of at least one of the feed header (5) and the product header (7) is detachable giving access to the channel ends and reactor comprising a housing (47) containing one or more of said reactor panels (1, 29), the reactor further comprising a feed line (51) and a product line (55), the panels (29) being connected to the feed line (51) and to product line (55).

15 Claims, 8 Drawing Sheets

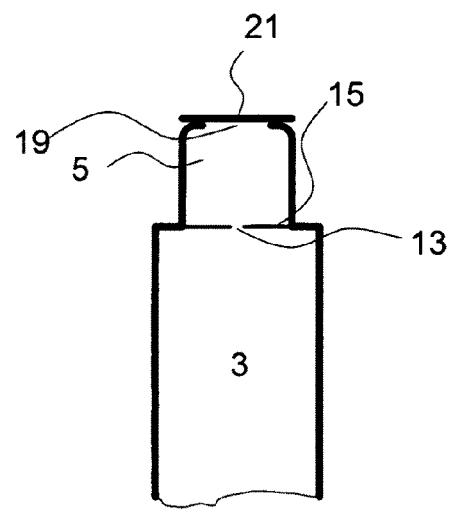
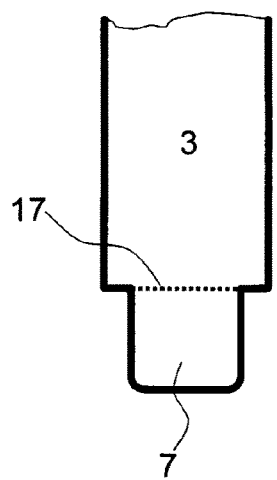
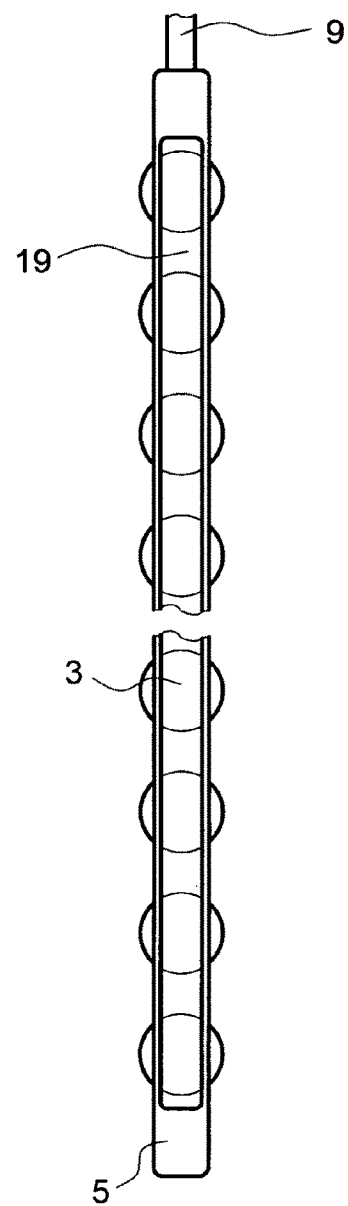
Fig. 2
Fig. 3

REACTOR PANEL FOR CATALYTIC PROCESSES

The present invention relates to a reactor panel for catalytic processes, a reactor comprising such panels and the use of said reactor for conducting heterogeneous catalytic exothermic or endothermic reactions.

Reactor types and the industrial application of catalytic reactors are broadly described by Klaus Dieter Henkel et al. in Ullmann Encyclopedia; Reactor Types, pages 1-33 (2005 Wiley VCH Verlag Weinheim).

Heterogeneous catalytic processes play a major role in chemical technology for producing many key products and intermediates. In these process fluid reactants, in particular gases, liquids and supercritical fluids, react in the presence of a solid catalyst, which can be present as particulate, for example pellets or powder, or continuous matter, for example coating on the reactor walls. Suitable reactors for heterogeneous catalytic processes include for example fixed-bed reactors. Characteristic features of a reactor with fixed beds of solid catalyst are the occurrence of large temperature gradients, especially when highly endothermic or exothermic reactions are combined with large bed diameters. For exothermic reactions there is also the danger of unstable operation points.

Fixed-bed reactors can be classified by the type of heat removal or supply. If the reaction process imposes special requirements on the minimum or maximum temperature in the fixed bed the design of the reactor must enable effective heat supply or removal by means of a large ratio between heat transfer area and fixed bed volume. This can be achieved by minimising the fixed bed diameter and by providing additional heat-transfer area inside the reactor volume. A known design for such a reactor is the multi-tubular reactor, which is frequently used in the chemical industry. These tubular reactors have favourable conditions for temperature control by heat supply or removal and no moving mechanical parts. However, they require a very high degree of specialization, often involving complicated design and high investment costs.

Multi-tubular reactors are applied e.g. for methanol synthesis, ammonia synthesis, partial oxidation reactions, vinyl acetate synthesis, methyl tert-butyl ether synthesis and Fischer-Tropsch reactions. This type of reactor provides a certain tuned amount of specific heat exchange area for effective heat removal or supply and the reactor contains furthermore reaction channels narrow enough for limiting the radial temperature gradient.

In multi-tubular reactors a large number of tubes are tightly connected to holes in a top and a bottom header plate. The tubes are filled with catalyst and the tube bundle is placed within a shell. Heating medium or coolant is circulated between the pipes. Reactants are fed to the top or bottom header plate and distribute themselves over the tubes. Flowing through the tubes the reactants in contact with the catalyst react to the final product that flows out of the tubes opposite to the feed side. Reactant and products streams and heating/cooling medium streams must remain separated.

Multi-tubular reactors show a number of disadvantages. To limit temperature gradients narrow tubes are preferred. However, the narrower the tubes, the more tubes are needed to obtain a desired reaction volume and production capacity. Each of these tubes is to be connected to the top and bottom header plate of the reactor, is to be connected to the reactants distribution header and the product collection header, and to be filled with catalyst. This nearly always leads to a non-optimal trade-off between number and diameter of the tubes. Also adding more tubes makes it more complex to achieve the desired heating/cooling regime. Further the feed supplied appears not evenly distributed over the various tubes.

Another disadvantage is that the stiff connection to both headers leads to mechanical stress due to thermal expansion of the tubes and frequent mechanical failure of multi-tubular reactors. This may lead to unwanted contact between reactant or product streams with heating/cooling medium streams and requires production stop and repair. Other disadvantages are the complex header construction necessary for separating process from utility streams and the resulting high investment costs for multi-tubular reactors. Furthermore, feed maldistribution leads to plugging of tubes and the self-propelling plugging effect of adjacent tubes. Another disadvantage is the tedious procedure for filling the tubes.

It is the object of the present invention to provide a reactor for chemical reactions having a cheaper construction, easier maintenance and less downtime.

This object is achieved according to the invention by providing a reactor panel that allows constructing a reactor containing a plurality of reaction channels in a modular way.

The invention thus provides a modular reactor panel for catalytic processes, comprising a feed header, a product header and substantially parallel adjacent channels, each channel having a length, running from an entrance end to an exit end, and wherein the entrance ends directly connect to and communicate with the feed header and the exit ends directly connect to and communicate with the product header and wherein the feed header has at least one connection to a feed line and the product header has at least one connection to a product line and wherein at least part of at least one of the feed header and the product header is detachable, giving access to the channel ends.

Each panel is a single self-supporting module and from these panels as modules a reactor of desired dimensions and capacity can be built, in particular a reactor for conducting heterogeneous catalytic processes. In these reactor, the channels, after the detachable part of at least one header has been detached, are easily accessible for emptying, cleaning and (re)filling with catalyst, wherein the panels can be separately and easily exchanged in the reactor, the panels allow great versatility in dimensions and give great flexibility in applying cooling/heating media to obtain desired temperature profiles along the channels.

Instead of a single huge pipe bundle as in the known multi-tubular reactors the required reaction volume can be built up from a number of reactor panels, each being lighter than the single pipe bundle and easier to handle, maintain and replace catalyst. During maintenance no heavy and bulky pipe bundle has to be hoisted from the reactor. Increasing reaction volume does not require connecting more and more tubes to the same bottom and top plates, but can be simply achieved by adding more or other type panels.

From U.S. Pat. No. 3,453,087 a modular reformer furnace is known that contains a row of reaction tubes or channels ('harp') connected to a feed and a product header. These essential parts, however, do not form an independent modular panel but need constructional support of and are integrated in the furnace, one of the headers even being positioned outside the furnace.

Further the channels are not connected directly to the feed header but each individually through a pig-tailed expansion loop. This causes the combination of channels, feed and product header not to be self-supporting, in contrast to the panel according to the invention that is a self supporting unit by the direct connection of the channels to the headers. This allows the panels to be hung in a reactor with their lower end free, which allows thermal expansion of the panel without requiring an expansion loop for each individual channel. As a further disadvantage of the known construction, access to the channels is only possible by removing one by one both ends of the expansion loops from the channels and the feed header individually, as described in the reference at column 8, lines 16 to 20. In the panel according to the invention removal of only the detachable part of a header gives direct access to all channels in one time.

The reactor panel comprises a feed header, a product header and substantially parallel adjacent channels that connect the feed header with the product header. Thus feed reactants supplied to the feed header will flow through the channels from their entrance end to their exit end into the product header. In operation the channels will be filled with a proper catalyst and the reactants will be converted into the desired product in contact with the catalyst when they flow through the channels. The product formed then leaves the panel from the product header.

It is noted that the reactor panel is also applicable for use with gaseous catalysts or initiators. In that case the catalyst is added to the reactants in gaseous or liquid form before the feed stream enters the feed header. The liquid will evaporate to gas when contacted with the heated reactants. When the panel is used for a homogeneous catalytic reaction the construction elements described later that serve to prevent a solid catalyst from falling out of the reaction channels can be omitted.

The advantage from the panel according to the invention also apply for reactions using a gaseous catalyst, be it for coke removal rather than for replacing catalyst.

The entrance ends of the channels directly connect to and directly open into the feed header which is to be understood that there is an open connection through which reactants from the feed header can enter into the channels, the entrance end of the channel being visible from within the header. Directly thus is to be understood as containing no intermediate construction elements as pig tails, bellows, pipes and the like but only direct connecting means like bolted flanges and welds.

In analogous way the product exiting from the channels can enter into the product header.

Feed header and product header have means to be connected to a feed line and a product line respectively for feeding reactants to and removing formed products from the panel. These means e.g. may comprise a threaded end, a flange or other known devices for making connections in fluid transporting equipment.

The combination of the channels connected to the feed header at one of their ends and to the product header at the other end forms a stable construction that allows the panel to be hung inside a reactor housing only supported at its top side. This allows thermal expansion of the panel just causing minimal stresses compared to those asserted to the combination of top and bottom header plates and tube bundle in the multi-tubular reactors.

Preferably at least one end of each channel is terminated with a screen material allowing the fluid reactants and product to pass. However, any openings in the screen material should be small enough to retain a particulate catalyst in the channel against gravity or entrainment into one of the headers by the fluid feed and product streams through the channel. This screen material will be attached removable to facilitate catalyst filling, removal and refilling of the tubes.

At least one of the feed header and the product header is detachable as a whole or partly giving access to the channel ends.

A partly detachable header may comprise an opening locked by a detachable part. The part may be hinged to a header edge that can be brought into an open position or may be a loose part that can be connected to and taken off the opening. The part must be gas and liquid tight connectable to the header and preferably also be easily removable. The connection may be established by bolting the detachable part to the header but the part may also be welded to the header and ground along the weld line for detaching the part.

After detaching the detachable part, the opening is giving access to the channels ends. This allows easy emptying, cleaning and refilling of the channels. Preferably such opening is present both in the feed and the products header. This allows emptying the channels through one header, positioning the panel such that this header is in a lower position than the other header and refilling the channels from above through the other header, keeping the panels in the same position.

The opening can be present in a header wall facing the ends of the channels or in a wall normal to the length direction of the channels. The former embodiment of these two is preferred as giving the easiest access.

The channels are arranged in at most two rows, each row defining a flat or curved plane, the planes running substantially parallel. Thus the panels remain slim in a first dimension and provide a large area for heat exchange relative to their volume.

Substantially is to be understood as running in the same direction with a mutual deviation between any pair of channels in a panel of at most 5°, preferably at most 3° and more preferably les than 1°. Preferably the channels are arranged in one straight or bent row to adapt to the shape of the reactor housing the panels are to be placed into. The feed and product headers then follow the shape of the channel row. Thus the panels are flat and when arranged in parallel at a proper distance the channels can be easily accessed by a cooling/heating medium flowing in the space between the panels, allowing accurate temperature control of the channels.

The channels in a panel can be arranged in rows in direct contact over their length or spaced. If they are spaced the channels are preferably connected to adjacent channels over at least part of their length. These connections provide additional heating/cooling surface and preferably the channels are connected to each other over their full length. These connections may be strips connecting the channels between their shortest distance but it can also be a sheet extending along a surface of the panel and joint to the channels over part of the total of the lengths of the channels. The width of these strips thus will be equal to the distance between adjacent channels. To achieve effective heat transport through the strips to or from the channels, the width of the strips generally will be smaller than the largest channel diameter and preferably smaller than 50% or even 25% of this diameter. Suitable width ranges up to 4 cm; preferably the width is 3 cm or less. The connections also promote heat exchange between channels, even further minimizing thermal stresses in the panel.

The panel in its dimensions other than said first dimension can have any shape than can be constructed with rows of channels. Practical examples of such shapes are rectangles, parallelograms and trapeziums. For application in a box or cylinder shaped reactor housing a substantially rectangular shape is most practical, wherein the channels run substantially parallel. When the panels are to be incorporated in a frusto-conical part of a reactor housing a trapezoidal shape is most practical. In such panel the channels will run under an angle with each other.

The panel according to the invention can be constructed simply and cheap e.g. from basic elements like tubes, folded plates, fittings, sheets and commonly known construction techniques as welding, bolt joints and others.

In a preferred embodiment the reactor panel according to the invention is composed of a first and a second parallel plate, bordered by a first pair of substantially parallel outer edges and a second pair of outer edges connecting the edges of the first pair, wherein at least the first plate comprises alternating flat connection strips and channel recesses having an entrance end and an exit end, the strips and recesses running normal to the first pair of edges, wherein the plates are joint together at least along the second pair of outer edges and the connection strips, combining the channel recesses of the first plate and the facing part of the second plate into channels, the panel further comprising a feed header and a product header both running substantially parallel with the first pair of edges, the feed header being connected with the entrance ends of the channels and the product header being connected with the exit ends of the channels.

The feed and product header can be formed also as a combination of a recess in one or both of the plates and the facing part of the second plate recesses.

In that case at least the first plate has a feed header recess running substantially parallel to a first edge of the first pair and directly along said first edge or separated from it by a first flat edge strip and a product header recess running substantially parallel to a second edge of the first pair opposite to the first edge and directly along said second edge or separated from it by a second flat edge strip, wherein the plates are joint together at the edge strips, the connection strips and along the outer edges, combining the feed recess, the product recess and the channel recesses of the first plate into a feed header, a product header resp. channels with the facing part of the second plate.

This embodiment has the advantage that only detachable parts have to be present as a separate element of the panel.

In another embodiment at least one of the feed header and the product header as a separate element is connected to the corresponding end of the channels.

This embodiment has the advantage that the accessibility of the channel entrance and exit end is more versatile and positioning and removing of catalyst screens and feed distribution plates may be easier.

This panel can be constructed easily and with high versatility by known techniques e.g. for manufacturing central heating radiator panels or in automotive industry. Forming metal plates into desired shape and profile by e.g. hot pressing allows to produces plates having complex shape and profile patterns. In another suitable process for constructing this panel, known as cold hydraulic pressing, two flat plates are welded together at the position of the edges and all other positions where the plates should be connected in the panel to be shaped and applying hydraulic pressure between the two plates in order to expand the non-welded parts into the required channels and headers.

Preferably a flat edge strip along each of the edges of the second pair is present for more secure tightening of the panel along that edge.

The panel joints should be gas and liquid tight apart from the connections to the feed and product line. Also the connection between the flat strips of a plate with the opposite plate should be gas and liquid tight, thus providing channels closed along their length. As a whole the panel should be gas and liquid tight apart from the connections to the feed and product line. This requirement applies to any panel according to the invention, be it constructed from single parts or from two parallel plates.

The panel according to this embodiment basically consists of two metal plates connected tightly, e.g. by welding or joining them by bolts, over at least part of their surface area. In this way recesses in one plate are closed off from the environment by the opposite facing part of the other, thus forming the required channels and headers and in one embodiment also consists of one or more separate headers.

At least one of the plates possesses the required shaping, the one other one may be flat but preferably both plates possess similar shaping in a cooperating pattern. In a first and preferred example of such cooperating pattern both plates have said recesses and strips at mirroring positions, wherein the recesses and strips of one plate face the mirroring recesses and strips of the other plate.

In particular the depth of mirroring recesses in the two plates may be different.

As a second example the cooperating pattern the feed and product header are in a mirroring position, whereas the alternating flat strips and reaction recesses are in staggered mirroring positions, so that a reaction recess of one plate faces a flat strip of the other one and vice versa. In this case the width of the flat strips preferably is larger than the width of the recesses. Then at least part of the flat strips of a plate along their length are in contact with the flat strips of the opposite plate thus providing a separating area between the channels formed by the channel recesses. In this embodiment the panel contains two parallel rows of channels.

In the panel composed of the two plates the necessary empty spaces, i.e. the channels and headers are present. In this respect the feed header is formed as the combination of the feed recess of one plate and the mirrored feed recess of the other plate. The same holds for the product header.

The feed and product recesses can be present as separate recesses connecting to the channel recesses. They can also consist of a, possibly less deep, end part of the channel recesses and a recess of the same depth present at the ends of and extending beyond the flat strips, thus forming a continuous recess extending along the edges of the first pair. Preferably the edges of the continuous recess then have been bend inwards or outwards to form a flange on which a detachable part is mounted to allow access to the channels.

Applying the same construction onto the ends of the channel recesses and connections strips allows secure mounting of separate feed and/or product headers The channels are present as a combination of a channel recess of one plate and the opposite part of the other plate. This part may be a channel recess, a flat strip or another flat part of that other plate.

The channels are intended to be filled with catalyst particles in such a way that empty spaces that run along the whole length of the channel are avoided as much as possible. Thus fluid entering the channels at the entrance end is prevented from reaching the exit end without having been sufficiently in contact with the catalyst and remaining unreacted. Although the cross section of the channels may have any shape, for the above reason the cross section of the channels preferably have a smooth and regular shape without sharp angles. Examples of such shapes are circular, elliptical or polygonal shapes with rounded edges.

A further advantage of the panel according to the invention is that different shapes may be present in one panel, in particular in the panel that is composed of two plates. The shape of the channels' cross section may be the same along the length of the channel but it is also possible that its shape varies along the length of the channel. As an example of this the cross section of a channel can be frusto-conical in one or two dimensions.

The panels are intended for application in chemical reactors and chemical reactions will be conducted in the channels. The construction elements forming the panels thus should consist of materials matching the reaction and process conditions and components that they will be exposed to. Known materials for use in chemical reaction conditions are metal, metal alloys and ceramic materials. It is also known in the art to apply protective coating layers. The skilled person will be able to select the proper materials in view of the intended use. Preferably the material shows sufficient heat conductivity.

The dimensions of the panels are mainly determined by the length and the number of the channels. These values may range broadly, depending on the type of reaction, the production capacity, the size and type of catalyst it is intended for. Since a large advantage of the panel is its modular character an array of panels may be of considerably smaller size than a single multi-tubular pipe bundle needed in a reactor for the same reaction and having the same production capacity.

Cross sectional area of the channels will depend on the type of catalyst and reaction. The more exothermic or endothermic the reaction runs the smaller this area will have to be to avoid an inhomogeneous reaction profile, in particular large radial temperature gradients, in the catalyst bed and to secure sufficient heat transport from the catalyst bed to or from the channel walls. In practice said area will lie between 5 and 300 $cm^2$. Preferably the area is less than 200, 100 or even 50 $cm^2$.

More critical than the area of the channels is the smallest linear dimension of a cross section of the channels. Preferably the shortest linear distance from any point of the channel cross sectional area to the channel wall is at most 3.5 cm. More preferably this distance is at most 2.5 cm. Shape of the channels may be circular, ellipsoidal or other smooth and regular shapes without sharp edges.

Channels must not have a too flattened shape in order to allow the desired flow within it. To this end, as a practical rule, the longest of all shortest linear distances should preferably be at least 1 cm when a solid catalyst is used and at least 2 mm when a gaseous catalyst is used.

The length of the channels may vary within wide boundaries, the upper length potentially being restricted by the pressure drop over the length of the channel. This pressure drop may also depend on the type and density of the catalyst bed. Suitable lengths will range from 0.5 to 10 meters.

The wall thickness of the channels, this thickness being the thickness of the plates in case the panel is constructed from two parallel plates, will be sufficient to withstand mechanical forces exerted on it, e.g. by pressure differences, gravity or mounting activities. At the higher end the thickness will be practically limited for panels according to the invention composed of two parallel plates by the requirement that the plates must be formable by usual techniques. Practical thickness may range from 0.5 to 5 mm.

Correspondingly the dimension of the panel will be determined by the sum of the dimensions of the composing parts. As an example, this dimension in the direction of the length of the channels will be at least equal to the length of the channels plus the height of the feed and product header in that direction. Also the thickness of the panel being its dimension normal to the direction of the length of the channels will be at least equal to the diameter of the channel in that direction plus the wall thickness of the channel and the thickness of any sheets on the outer surface.

The invention further relates to a reactor comprising a housing containing one or more reactor panels according to the invention as described hereinbefore, the reactor further comprising a feed line and a product line, the panels being connected to the feed line and to the product line.

The reactor according to the invention, in particular a reactor for conducting heterogeneous catalytic processes, thus comprises a number of reactor panels instead of a single huge pipe bundle. Thus the same reactor production capacity is achieved in a modular way by combining the proper number of suitably dimensioned panels.

A reactor according to the invention having the same production capacity as one containing a single pipe bundle will contain a number of panels, each panel being considerably smaller and lighter than the single pipe bundle. These panels are much easier to handle and it is easier to maintain the reactor according to the invention than a conventional reactor. During maintenance no heavy and bulky pipe bundle has to be hoisted from the reactor. Increasing the reactor capacity does not require connecting more and more tubes to the same bottom and top plates, but can be simply achieved by adding more or other type panels.

Also the reactor according to the invention offers great versatility with respect to heat exchange properties. The relative position and distance of the panels can be freely chosen allowing creating envisaged and effective heat exchange flow through channels and patterns. In contrast in a reactor comprising a single tube bundle the distribution of the tubes over the bundle is fixed and cannot be freely chosen or easily adapted.

The reactor according to the invention can be applied for continuous and batch reaction processes.

As a further advantage of the reactor according to the invention, in case of failure of channel, leakage or other incidents only the panel involved has to be removed from the reactor and replaced or just cut off before production can be resumed. Repair or refill can be done per panel off-line while production is continued. In the known reactor comprising a single tube bundle production is shut down until repair is finished.

The panels are connected to a feed line, for supply of reactants, and to a product line, for removal of reaction products. This connection can be made through the connection to those lines present in the panels according to the invention. Making such connections is routine in the field of reactor technology. The different panels e.g. can be connected to a feed manifold or distributor inside or outside the reactor housing, which manifold or distributor in turn is connected to a common feed line, providing the required feed from outside feed storage or other feed capacity. The manifold or the individual connection lines will be preferably dimensioned, e.g. by their diameters, properly in order to secure an even distribution of the incoming feed over the panels. Also preferably the connection from the panel to the feed line is flexible in the sense that differences in thermal expansion between the panels and the connection to the feed line can be absorbed minimizing stresses. Constructive elements to achieve this flexibility are known in the art and as examples can be mentioned that the feed line contains a pigtail tube part or a bellow shaped connection part.

The homogeneous feed distribution over the channels of each panel, is controlled by the pressure drop inside each channel. Preferably the entrance end of each catalyst tube is provided with flow restricting means suitable to impose a near-critical pressure drop on a feed flow entering the tube. This secures a constant feed flow rate to the channels, even when the channels do not have exactly the same pressure drop. Difference in pressure drop may occur due to differences in catalyst filling or packing within considerable ranges and also may occur during operation by coke build up. The near-critical pressured drop is defined as the pressure drop causing the flow velocity to be at least 50%, preferably at least 70, more preferably at least 80% of the critical flow velocity.

The pressure drop from the feed header to channels can be controlled by limiting the area of the entrance of the channels. Usually the panels will be mounted vertically in a reactor and a screen will be present at the bottom side to retain the catalyst. If the feed is to be entered at a top side, there may present at that top side then a platelet closing off the entrance end and having one or more orifices of suitable size to achieve the desired pressure drop. Such platelet may have an open tubule extending from the platelet down into the channel. If the feed is to be entered at the bottom side the screen to retain the catalyst may have orifices in suitable number and size together having the desired entrance area for the feed to achieve the desired pressure drop. Alternatively, in combination with such screen, dimensioned then to just retain the catalyst, there may be further present at the bottom entrance end of the channels a platelet closing of the entrance end and having one or more orifices of suitable size. Such platelet may have an open tubule extending from the platelet up into the channel. It is also possible to close the entrance of the channels only with a platelet having a tubule functioning at the same time as a device to retain the catalyst in the channel and to determine the feed low into the channel. Calculation of the proper number and size of the holes is straightforward for the skilled person in technology from input data such as the pressure in the feed header, the number of channels, the desired pressure over the channels and the length of the channels. Preferably any platelet is mounted in a detachable manner to allow easier filling an emptying of the channels.

The panels are further connected to a product line for collecting and bringing the formed product outside the reactor for further processing.

The panels usually will be vertically positioned in the reactor. The channels then run substantially vertically and the headers will run essentially horizontally. The panels usually will be arranged in parallel at a distance of each other. This distance may depend on the heat exchange regime envisaged and may range between 1 mm and 3 cm. Larger distances are possible but have proven less efficient for heat exchange and also require a larger heat exchange gas flow. The distance between the panels meant here is the shortest normal distance between two adjacent parallel panels, measured between the channel of one panel to the opposite part, channel, header or strip, of the adjacent panel.

In all embodiments of the panel it is advantageous when at least one of product and feed header extends outside the channels in a direction normal to the flat sides of the panel. In this case the distance between adjacent panels is smaller at the headers than at the channels. This introduces a pressure restriction for the heating medium entering between adjacent panels that promotes a more even distribution of the heating medium over the row of panels in the reactor.

The panels can be mounted within the reactor supported by but preferably not fixed to constructive elements of the housing. Preferably the panels when shrinking or expanding can move with respect to the housing. This avoids the occurrence of thermal stresses between the panels and the housing.

Preferably the panels are hung only supported at their higher end. This allows thermal expansion or shrinkage of the panels only causing minimal stresses stretching the operational life and reliability of the panels and thus of the reactor as a whole. The housing of the reactor shields the inner reactor volume from the environment and will have the normal and known properties of a reactor housing adapted to the governing reaction and heat exchange conditions. The inner part of the reactor is only open to controlled input and output piping for supply and outlet of feed, product, heat exchange medium and other usual utilities known for operating a reactor.

Between the housing and the reactor panels heat screens may be present. This is to prevent the outer panels facing the housing from being irradiated by the housing that will also be heated or cooled by the exchange medium. This would cause the outer panels to be more heated or cooled than the inner panels. In case of overheating this might even lead to coke formation in the channels of the outer panel. These screens may e.g. be cooled or heated plates. They also may be reactor panels according to the invention, not being filled with catalyst, heat exchange medium flowing through the channels.

The reactor further comprises means for transporting a heating medium or coolant along the panels.

As heat exchange medium heated or cooled gases or liquids can be used, e.g steam and flu gases are suitable heat exchange media. The flow direction of the heat exchange medium may be counter current to, co current with or in cross flow with the flow direction from the feed entrance end of the channels to the product exit end thereof. Baffles may be present to guide the flow but are not necessary in the reactor according to the invention.

In the reactor two adjacent panels may be connected along the length of the edges of the second pair by a strip that allows relative movement of the panels, forming a dual panel. The strip may e.g. be bent or have a zigzag or bellow shape. Thus a space open at its top and bottom end is formed between the two connected panels. A reactor containing such connected dual panels comprises a number of spaces that can be separately connected to a first heat exchange medium that is only in contact with the dual panel surfaces facing one another. The other panel surfaces then can be contacted with a heat exchange medium differing from said first medium in composition and/or other properties. This allows further tuning of the heat exchange regime in the reactor. If the first heat exchange medium is steam it can be, after having flowed along the surfaces, be mixed with the feed to preheat this.

Further the reactor will be supplied of the further, required as known in the art, provisions and utilities for reliably, safely and effectively exploit this type of reactors.

The channels of the panels can contain the catalyst suitable for the reaction envisaged to be conducted in the reactor. The catalyst may be present as particles but also as a coating on the wall of the channels. In this case the channels should be narrow, in particular the largest radial dimension of the channel should lie between 5 mm and 10 cm. Larger dimensions are possible but may be less effective due to the unfavourable ratio of the reactor channel volume and its catalyst coated surface.

The reactor is particularly suitable for conducting reactions where exchange of heat produced by or needed for the reaction is required. In particular heterogeneous catalytic reactions can be conducted in the reactor according the invention effectively and with great versatility. Preferably the catalyst is present in the channels as a fixed bed. The catalyst preferably is in particulate form. Suitable size of the catalyst in relation the smallest radial dimension of the channels is common knowledge in the catalytic reactor field. As a rule of thumb the particle size of the catalyst will be smaller than 0.1 times the channel diameter. Larger diameters are possible but then the risk of reactant leakage between channel wall and catalyst bed may occur.

In view of the above the invention also relates to the use of the reactor according to the invention for conducting a heterogeneous catalytic exothermic or endothermic reaction.

Examples of such chemical reactions include partial oxidation of for instance ethylene, xylene, naphthalene, propene, acryloine, methanol and ethanol, alkylation of for instance benzene with ethylene or propylene, dehydrogenation of for instance C2-C8 alkanes, ethylbenzene or cyclohexanol, (de)hydratation reactions, hydroformylation reactions and oxychlorination reactions.

The invention will be further elucidated by the following illustrative drawings, without being restricted thereto.

In these drawings:

FIG. 2 is a cross section of this panel along the line A-A;

FIG. 3 is a top view of this panel having its opening unlocked;

Figure 6:
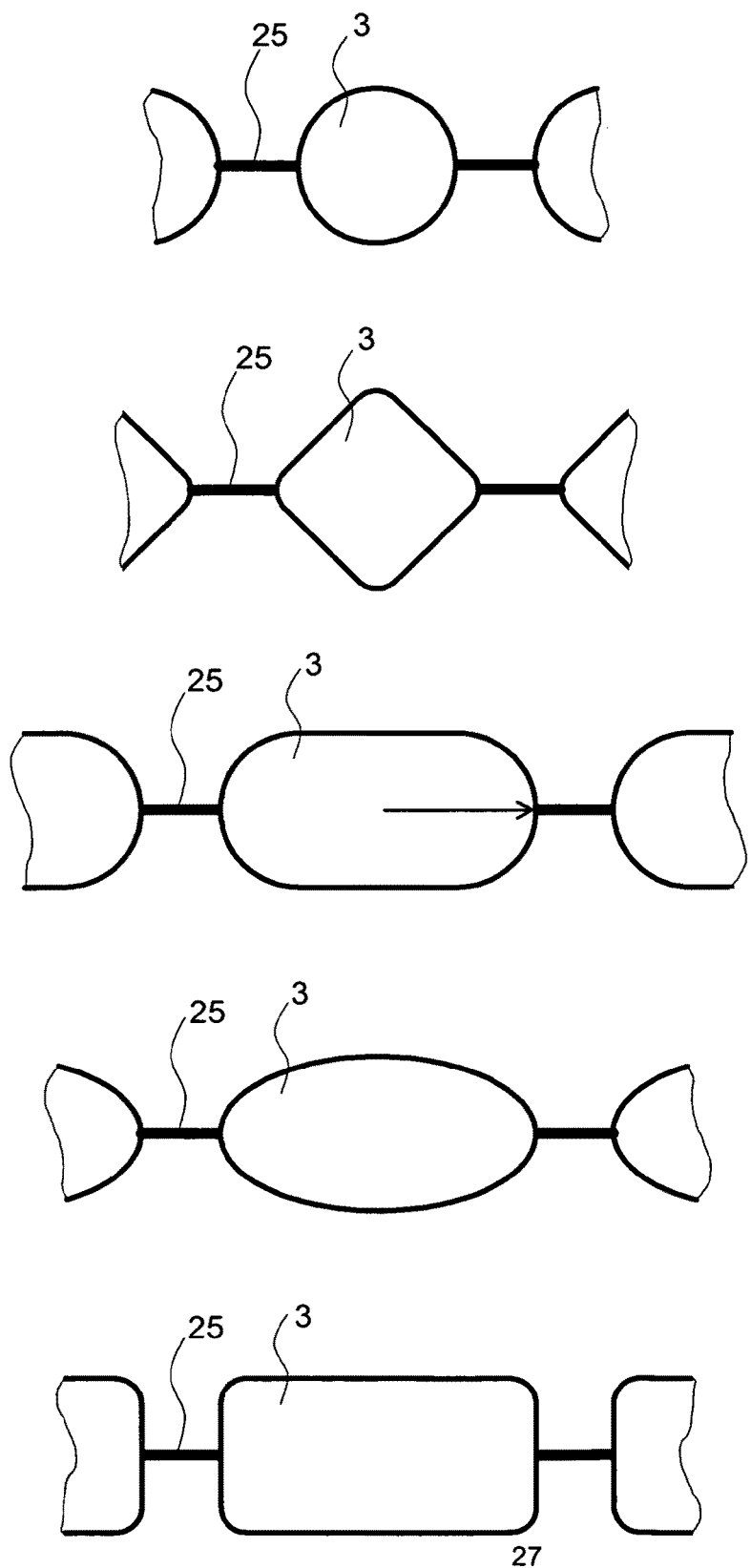
Figure 7:
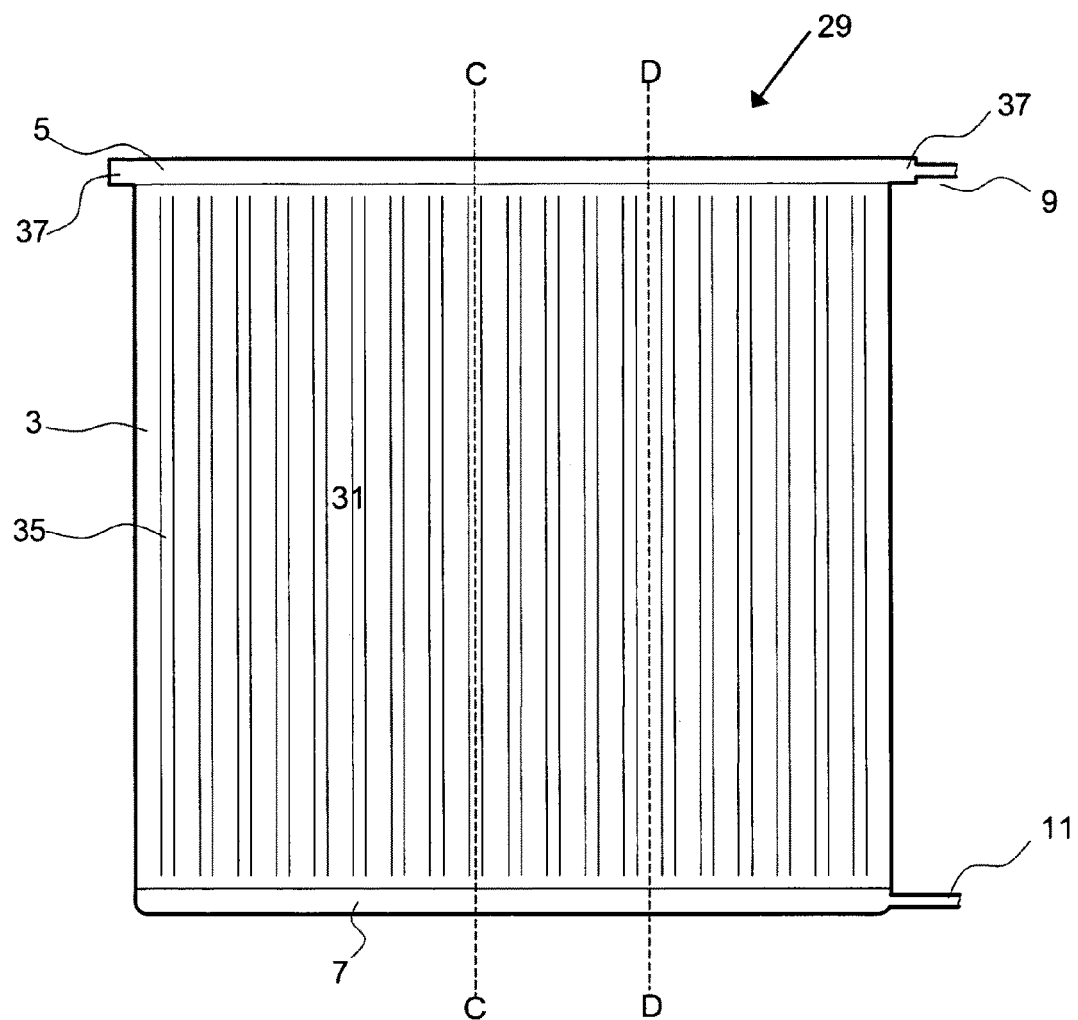
Figures 8, 9:
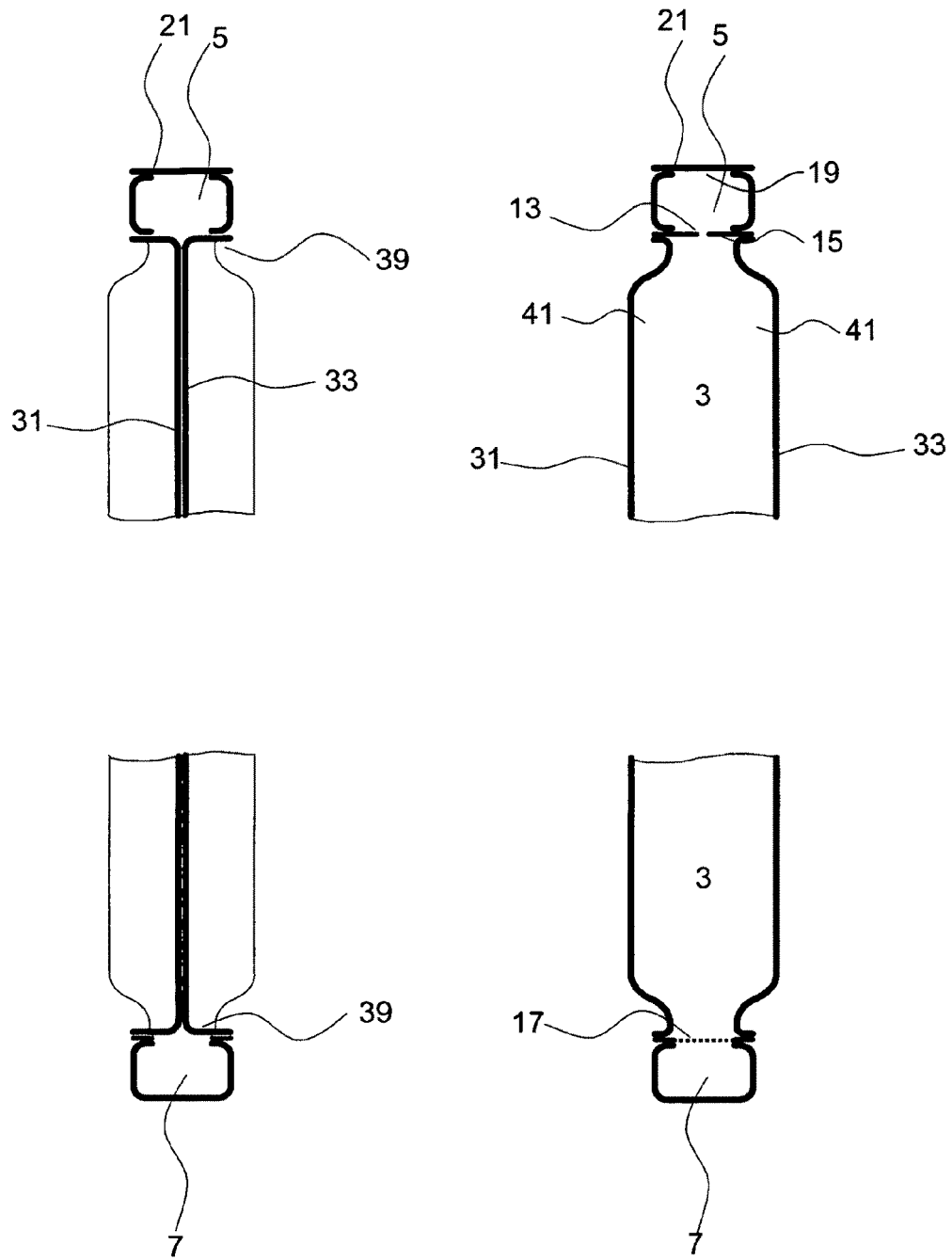
Figure 10:
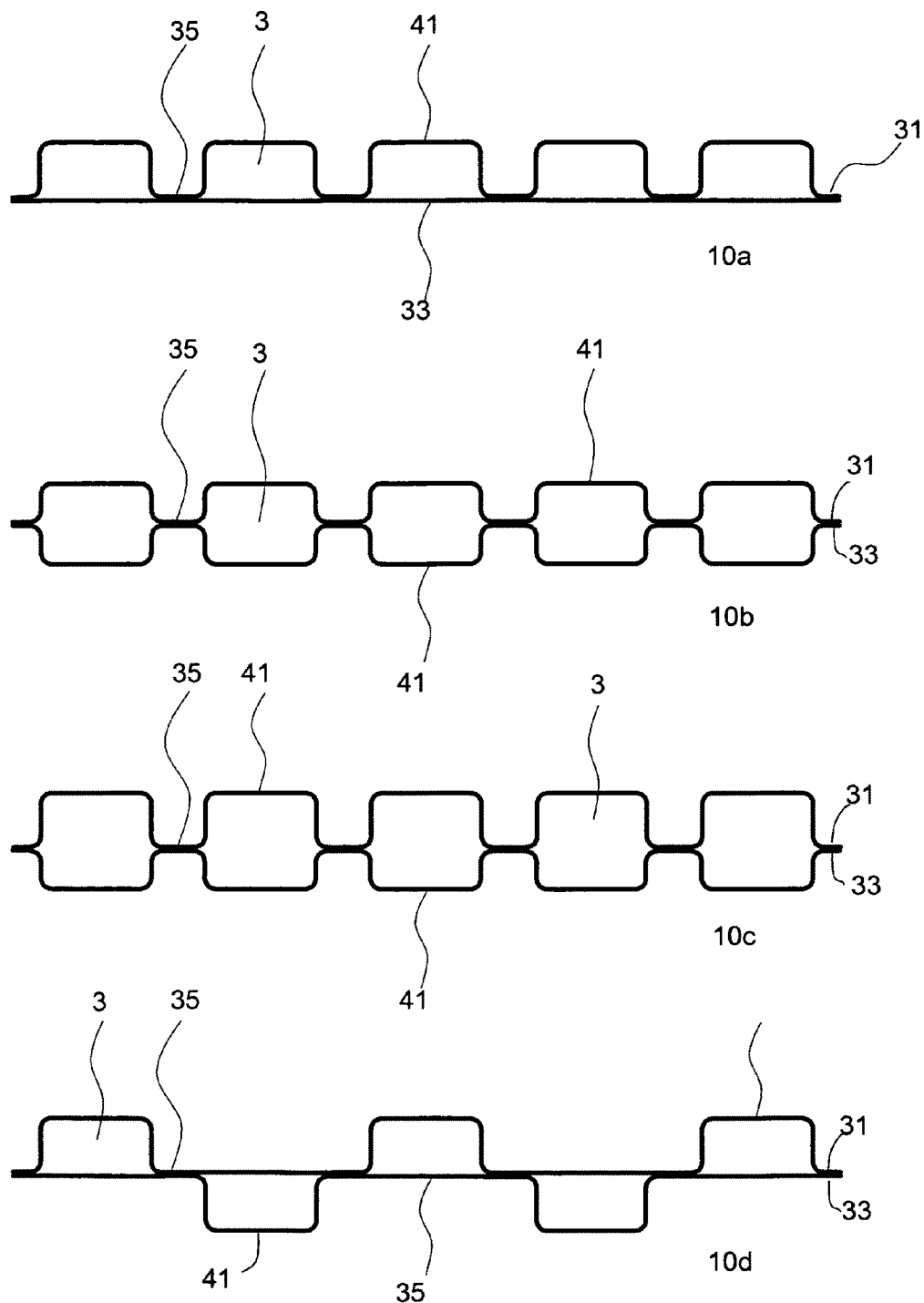
Figure 11:
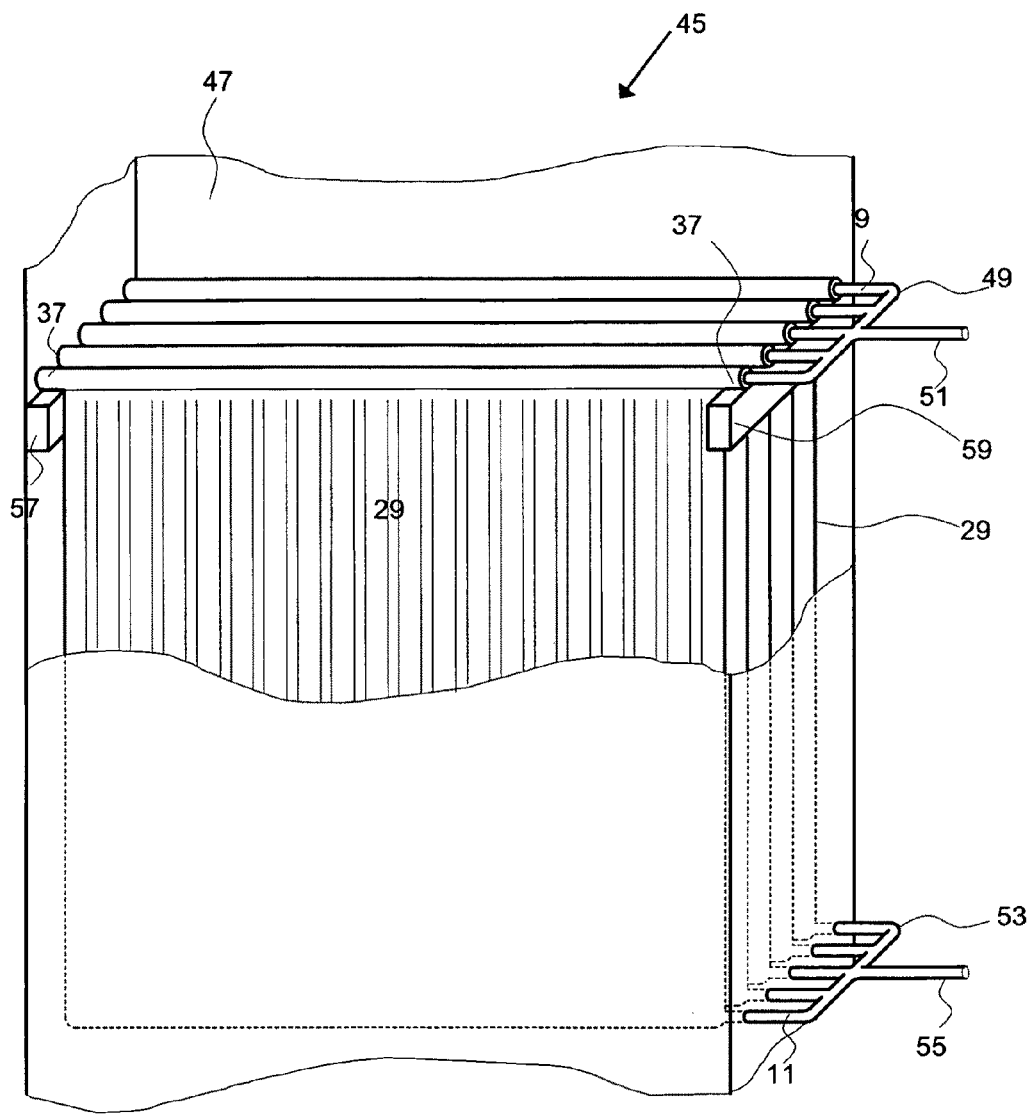

In FIG. 4, FIGS. 4a-d show a front view of panel sections showing various embodiments of unconnected and mechanically and thermally connected adjacent channels;

In FIG. 5, FIGS. 5a-5d show a cross section of FIGS. 4a-4d along the line B-B;

FIG. 6 shows a number of suitable channel cross section shapes;

FIG. 7 is a front view of a rectangular panels according to the invention constructed from two parallel plates;

FIG. 8 is a cross section of the panel of FIG. 7 along the line C-C;

FIG. 9 is a cross section of the panel of FIG. 7 along the line D-D;

In FIG. 10, FIGS. 10a-10d show cross sections normal to the length direction of the channels for different combinations of parallel plates; and FIG. 11 is an elevated view of a reactor according to the invention.

It is noted that in the drawings the feed channel is at the top side of the panels but in the panel and reactor according to the invention it is also possible to have this feed side at the bottom of the panels.

Figure 1:
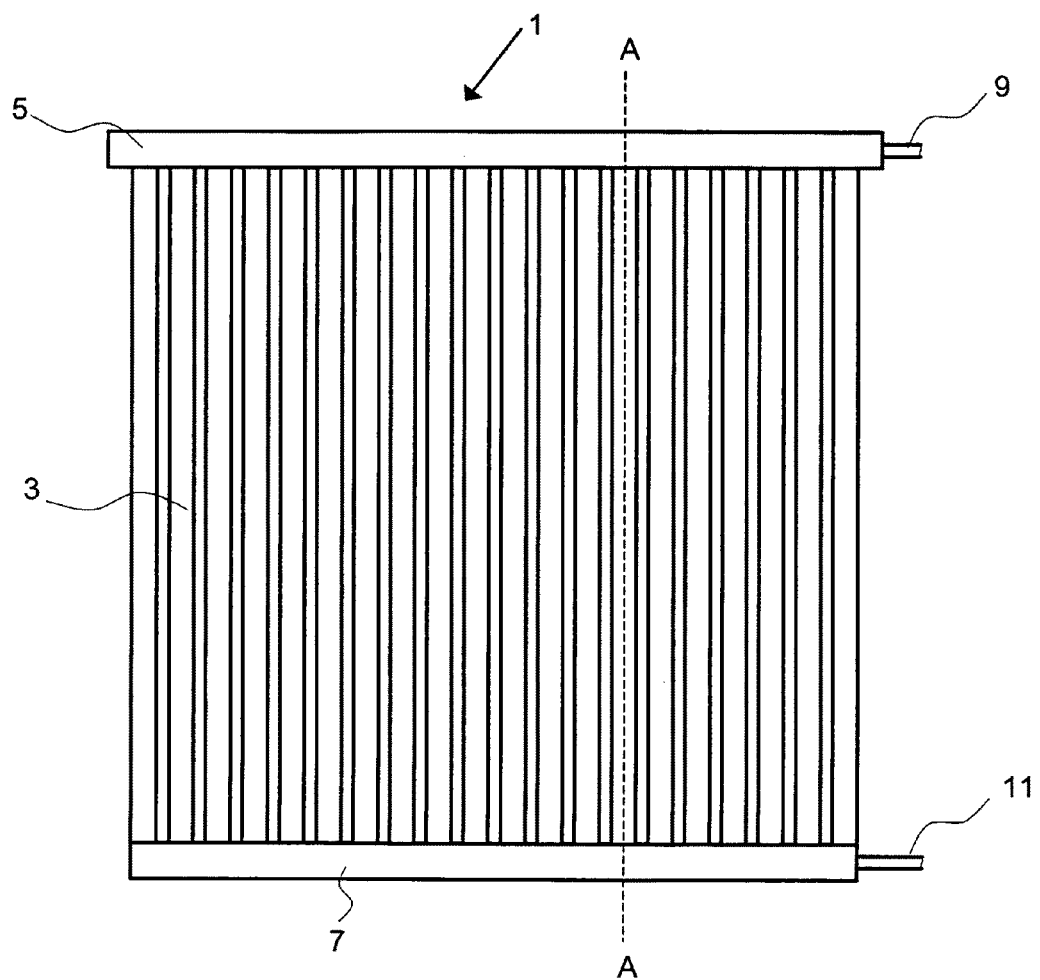
FIG. 1 is a front view of a panel according to the invention, constructed from separate elements.
Figure 4:
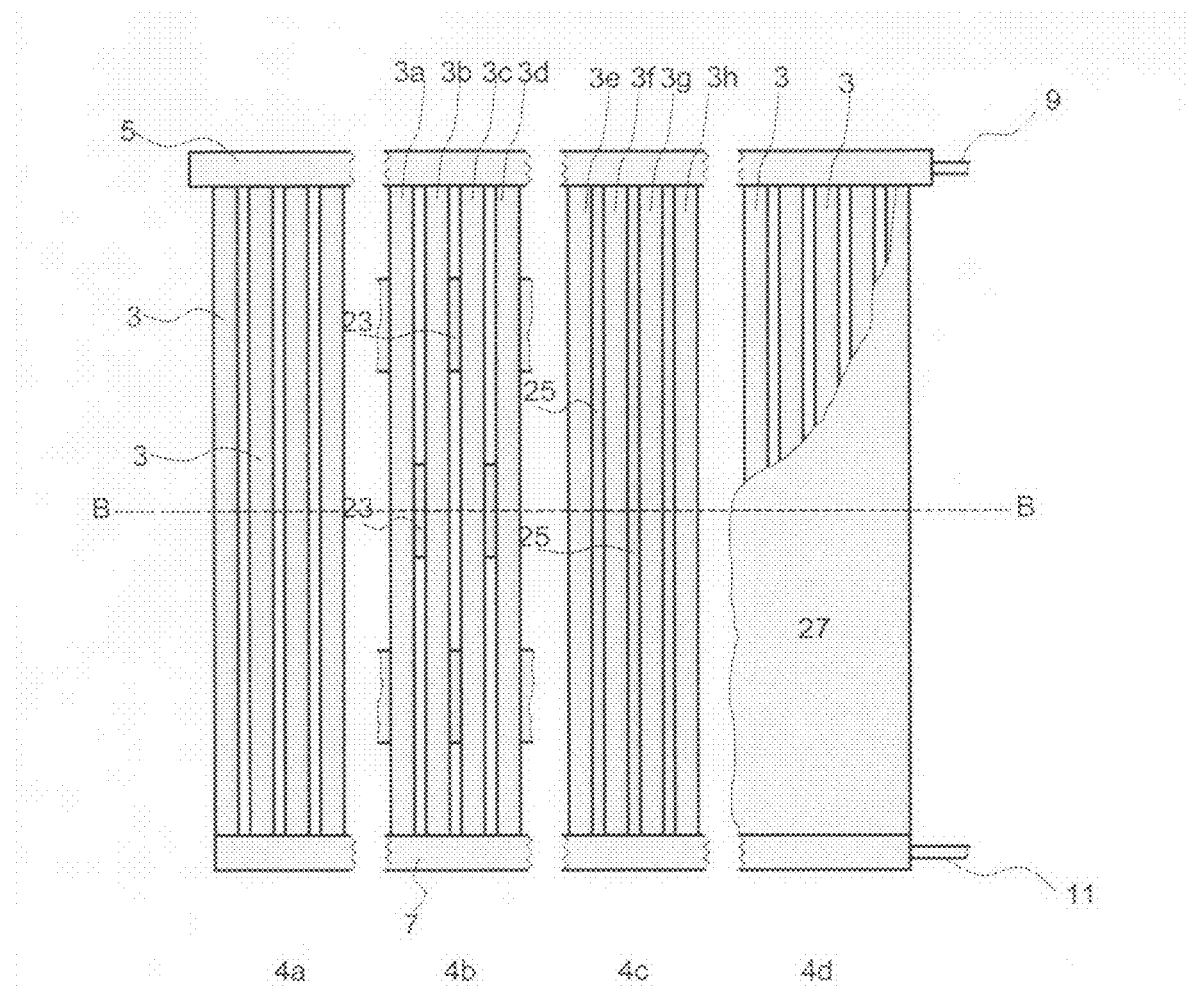
Figure 5:
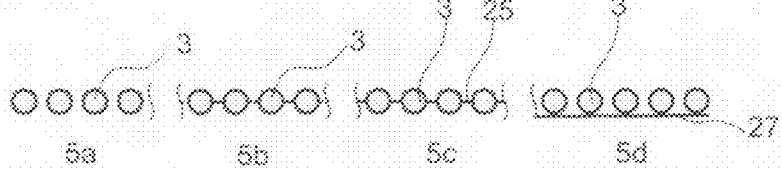

In FIG. 1 a panel 1 is shown, consisting of tubes 3 as channels, each channel connected to feed header 5 and product header 7. Feed header 5 has a connection 9 to be connected to a feed line. Product header 7 has a connection 11 to be connected to a product line.

In FIG. 2 channel 3 communicates through orifice 13 in platelet 15, positioned at the entrance end of channel 3, with feed header 5. Through catalyst retaining screen 17 channel 3 communicates with product header 7. Opening 19 in the top of feed header 5 is locked with detachable part or lid 21.

In FIG. 3 opening 19 in feed header 5 is unlocked (lid removed) and is seen to extend over nearly its whole length and giving access to channels 3.

In FIG. 4a channels 3 are unconnected. In FIG. 4b channels 3a-3d are two-by-two connected by separate flat strips 23 to enhance mechanical stiffness of the panel and thermal exchange properties. With similar but enhanced effect in FIG. 4c channels 3e to 3h are connected to each adjacent channel with a flat strip 25 extending along the length of the channels. In FIG. 4d part of a flat sheet 27 is shown, connected to the channels 3 it covers.

In FIGS. 5a-5d channels 3 are unconnected resp. connected with their centre parts by strips 23 and 25 and flat sheet 27.

In FIG. 6 various suitable channel cross section shapes of channels 3 are shown. Adjacent channels are connected by flat strips 25.

In FIG. 7 a panel 29 is shown, consisting of front plate 31 and (not visible) mirroring rear plate 33. Channels 3 and channel strips 35 run from feed header 5, running to product header 7. Uppermost boundary of feed header 5 forms a first edge of the first pair of outer edges and lowermost boundary of product header 7 forms the second edge of this first pair. Panel 29 also has a connection 9 to be connected to a feed line and connection 11 to be connected to a product line. It has also support protrusions 37 connected to the feed header 5.

In FIG. 8 flat channel strips of plates 31 and 33 are joint together and mechanically, but gas and liquid tight, connect feed header 5 with product header 7. Feed header 5 and product header 7 are separate elements connected to outward bent strips 39 of plates 31 and 33. Feed header is closed with lid 21.

In FIG. 9 mirroring recesses 41 of plates 31 and 33 form a channel 3. This channel 3 communicates through orifice 13 in platelet 15, positioned at the entrance end of channel 3, with feed header 5. Through catalyst retaining screen 17 channel 3 communicates with product header 7. Opening 19 in the top of feed header 5 is locked with lid 21. Orifice 13 and screen 17 allow gas or liquid to move from the feed header 5 to the product header 7.

In FIG. 10a plate 31 has alternating channel recesses 41 and flat channel strips 35 while opposite plate 33 is flat. In FIG. 10b both plates 31 and 33 have channel recesses 41, in both plates of same depth, and flat channel strips 25 in mirrored position. FIG. 10c is as FIG. 10b, the only difference being the channel recess 35 in plate 31 being deeper than those of plate 33. In FIG. 10d also both plates 31 and 33 have channel recesses 41 but now in a staggered mirrored position and flat channel strips 35 between the recesses. In all cases 10a-10d the plates bonded together form channels 3. In all figures a flat edge strip is present at the ends of plates 31 and 33.

In FIG. 11 45 is a reactor having a housing 47 and containing a row of reactor panels 29 as shown in FIG. 7. Feed connections 9 are connected to flexible feed manifold 49 ending in feed line 51. Product connections 11 are connected to flexible product manifold 53 ending in product line 55. Feed line 51 and product line 55 can be connected to storage means for feed and product (not shown here).

Panels 29 rest with their support protrusions 37 on joists 57 and 59, which form part of housing 47 of reactor 45, without being fixed thereto. Apart from this support at the top the panels 29 are hanging free in the reactor.

The invention claimed is:

1. A modular reactor panel (1) for catalytic processes, comprising a feed header (5), a product header (7) and adjacent channels (3), each channel (3) having a length, running from an entrance end to an exit end, and wherein the entrance ends are directly connected to and open into the feed header (5) and the exit ends are directly connected to and open into the product header (7) and wherein the feed header (5) has at least one connection (9) to a feed line (51) and the product header (7) has at least one connection to a product line (55) and wherein part (21) of at least one of the feed header (5) and the product header (7) is detachable giving access to the channel ends.

2. The modular reactor panel according to claim 1, wherein the channels (3) are arranged in at most two rows, each row defining a flat or curved plane (31), the planes running substantially parallel.

3. The modular reactor panel according to claim 1 wherein the panel (3) is rectangular and the channels run substantially parallel.

4. The modular reactor panel according to claim 1, wherein at least one of the entrance and the exit end of each channel (3) is terminated with a screen material (17).

5. The modular reactor panel according to claim 1, wherein each channel (3) is connected over at least part of its length to its adjacent channels.

6. The modular reactor panel according to claim 1, composed of a first (31,33) and a second parallel plate (33, 31), bordered by a first pair of substantially parallel outer edges and a second pair of outer edges connecting the edges of the first pair, wherein at least the first plate (31,33) comprises alternating flat connection strips (35) and channel recesses (41) having an entrance end and an exit end, the strips (35) and recesses (41) running normal to the first pair of edges, wherein the plates are joint together at least along the second pair of outer edges and the connection strips (35), combining the channel recesses (41) of the first plate (31,33) and the facing part of the second plate (33,31) into channels (3), the panel further comprising a feed header (5) and a product header (7) both running substantially parallel with the first pair of edges, the feed header (5) being connected with the entrance ends of the channels (3) and the product header (7) being connected with the exit ends of the channels (3).

7. The modular reactor panel according to claim 6 wherein at least the first plate (31,33) has a feed header recess running substantially parallel to a first edge of the first pair and directly along said first edge or separated from it by a first flat edge strip and a product header recess running substantially parallel to a second edge of the first pair opposite to the first edge and directly along said second edge or separated from it by a second flat edge strip, wherein the plates are joint together at the edge strips, the connection strips and along the outer edges, combining the feed recess, the product recess and the channel recesses of the first plate into a feed header (5), a product header (7) resp. channels (3) with the facing part of the second plate (33,31).

8. The modular reactor panel according to claim 6 wherein at least one of the feed header (5) and the product header (7) as a separate element is connected to the corresponding end of the channels (3).

9. The modular reactor panel according to claim 1, wherein both plates (31,33) have said recesses (41) and strips (35) at mirroring positions, wherein the recesses and strips of one plate face the mirroring recesses and strips of the other plate.

10. A reactor comprising a housing (47) containing one or more reactor panels (1, 29) comprising a feed header (5), a product header (7) and adjacent channels (3), each channel (3) having a length, running from an entrance end to an exit end, and wherein the entrance ends are directly connected to and open into the feed header (5) and the exit ends are directly connected to and open into the product header (7) and wherein the feed header (5) has at least one connection (9) to a feed line (51) and the product header (7) has at least one connection to a product line (55) and wherein part (21) of at least one of the feed header (5) and the product header (7) is detachable giving access to the channel ends, the reactor further comprising a feed line (51) and a product line (55), the panels (29) being connected to the feed line (51) and to product line (55).

11. The reactor according to claim 10, further comprising means for transporting a heating medium or coolant along the panels.

12. The reactor according to claim 10, wherein substantially all channels (3) of the panels contain a catalyst.

13. The reactor according to claim 12, wherein the catalyst is present in the channels (3) as a fixed bed.

14. The reactor according to claim 10, wherein heat screening means are present between the housing and the reactor panels.

15. A process comprising a heterogeneous catalytic exothermic or endothermic reaction in a reactor comprising a housing (47) containing one or more reactor panels (1, 29) comprising a feed header (5), a product header (7) and adjacent channels (3), each channel (3) having a length, running from an entrance end to an exit end, and wherein the entrance ends are directly connected to and open into the feed header (5) and the exit ends are directly connected to and open into the product header (7) and wherein the feed header (5) has at least one connection (9) to a feed line (51) and the product header (7) has at least one connection to a product line (55) and wherein part (21) of at least one of the feed header (5) and the product header (7) is detachable giving access to the channel ends, the reactor further comprising a feed line (51) and a product line (55), the panels (29) being connected to the feed line (51) and to product line (55).

* * * * *